US008413908B2

(12) United States Patent
Martinez Abietar et al.

(10) Patent No.: US 8,413,908 B2
(45) Date of Patent: Apr. 9, 2013

(54) OPTICAL SECURITY MARK COMPRISING METAMATERIALS WITH A MAGNETIC RESPONSE, AUTHENTICATION METHOD USING SAID MARK, AND USE OF SAID MARK APPLIED TO AN OBJECT

(75) Inventors: Alejandro Jose Martinez Abietar, Valencia (ES); Carlos Garcia Meca, Valencia (ES); Javier Marti Sendra, Valencia (ES)

(73) Assignee: Universitat Politecnica de Valencia, Valencia (ES)

( * ) Notice: Subject to any disclaimer, the term of this patent is extended or adjusted under 35 U.S.C. 154(b) by 0 days.

(21) Appl. No.: 13/260,217

(22) PCT Filed: Mar. 26, 2010

(86) PCT No.: PCT/ES2010/000125

§ 371 (c)(1), (2), (4) Date: Sep. 23, 2011

(87) PCT Pub. No.: WO2010/109036

PCT Pub. Date: Sep. 30, 2010

(65) Prior Publication Data

US 2012/0018509 A1 Jan. 26, 2012

(30) Foreign Application Priority Data

Mar. 27, 2009 (ES) .................................. 200900944

(51) Int. Cl.
*G06K 19/06* (2006.01)

(52) U.S. Cl. .......................... 235/493; 235/375; 369/84

(58) Field of Classification Search .................. 235/493, 235/375; 369/84

See application file for complete search history.

(56) References Cited

U.S. PATENT DOCUMENTS

| | | | | |
|---|---|---|---|---|
| 2003/0058491 | A1 | 3/2003 | Holmes et al. | |
| 2010/0054100 | A1 * | 3/2010 | Deguchi et al. | 369/84 |

FOREIGN PATENT DOCUMENTS

| | | |
|---|---|---|
| WO | WO 2006/023195 | 3/2006 |
| WO | WO 2008/110775 | 9/2008 |

OTHER PUBLICATIONS

Boltasseva, et al., "Fabrication of optical negative-index metamaterials: Recent advances and outlook" *Metamaterials* (2008) 2: 1-17.

Garcia-Meca, et al, "Low-loss single-layer metamaterial with negative index of refraction at visible wavelengths" *Optics Express* (2007) 15(15): 9320-9325.

Menzel, et al., "Retrieving effective parameters for metamaterials at oblique incidence" *Physical Review B* (2008) 77: 195328-1-195328-8.

(Continued)

*Primary Examiner* — Allyson Trail

(74) *Attorney, Agent, or Firm* — Knobbe Martens Olson & Bear LLP

(57) ABSTRACT

The invention relates to an optical security mark that can be applied to an object, said mark comprising a structure made of a metamaterial that generates a magnetic response to incident radiation having a wavelength (λ) corresponding to a specific code of formula μr(λ) where μr is the relative magnetic permeability of the metamaterial and λ is a wavelength of the incident radiation having a value of between 15 nm and 1100 nm, or a specific code of formula λ(μr) or combinations of said codes. Said mark has a first tranverse dimension bx in a first transverse extension of the metamaterial and a second transverse dimension by in a second transverse extension of the metamaterial, different from the first transversal dimension, the first transverse dimension and the second transverse dimension each being at least equal to the wavelength (λ) of the incident radiation.

21 Claims, 5 Drawing Sheets

OTHER PUBLICATIONS

Pendry, et al., "Extremely Low Frequency Plasmons in Metallic Mesostructures" *Physical Review Letters* (1996) 76(25): 4773-4776.
Pendry, et al, "Magnetism form Conductors, and Enhanced Non-Linear Phenomena" dated Feb. 3, 1999, from /word/pap/wecs/magwires.doc.
Shalaev, Vladimir M., "Optical negative-index matamaterials" *Nature Photonics* (2007) 1: 41-48.
Shelby, et al., "Experimental Verification of a Negative Index of Refraction" *Science* (2001) 292: 77-79.
Smith, et al., "Determination of Effective Permittivity and Permeability of Metamaterials from Reflection and Transmission Coefficients" *Phys. Rev. B* (2002) 65: 1-17.
Yen, et al., "Terahertz Magnetic Response from Artificial Materials" *Science* (2004) 303: 1494-1496.
Zhang, et al., "Midinfrared Resonant Magnetic Nanostructures Exhibiting a Negative Permeability" *Physical Review Letters* (2005) 94: 037402-1-037402-4.
Zhou, et al., "Saturation of the Magnetic Response of Split-Ring Resonators at Optical Frequencies" *Physical Review Letters* (2005) 95: 223902-1-223902-4.
International Search Report, dated Sep. 8, 2010, issued in International Application No. PCT/ES2010/000125.

* cited by examiner

OPTICAL SECURITY MARK COMPRISING METAMATERIALS WITH A MAGNETIC RESPONSE, AUTHENTICATION METHOD USING SAID MARK, AND USE OF SAID MARK APPLIED TO AN OBJECT

RELATED APPLICATIONS

This application is a U.S. National Phase of International Application No. PCT/EP2010/000125, filed Mar. 26, 2010, designating the U.S. and published on Sep. 30, 2010 as WO 2010/109036, which claims priority to Spanish Patent Application No. P200900944, Mar. 27, 2009. The content of these applications is incorporated herein by reference in its entirety.

TECHNICAL FIELD OF THE INVENTION

The present invention is comprised in the technical field of security elements which allow verifying the authenticity of objects provided with such elements and, more specifically, in the sector of optical security elements based on structures of metamaterials.

BACKGROUND OF THE INVENTION

A number of common objects incorporate optical security devices conferring authenticity to the object. For example, banknotes contain certain regions which change colors when the position from which they are observed or seen is changed. These devices are generally flat structures producing effects in the incident light and allow identifying the genuineness of an object to the naked eye. However, they can be counterfeited by using similar structures or other less sophisticated structures producing a similar response such that the counterfeiting cannot be identified as such to the naked eye. Therefore, a primary objective of optical security devices is for them to produce an optical response preventing the counterfeiting thereof. In other words, a structure must be created the optical response (or signature) of which cannot be synthesized by other means. There are a number of techniques for producing optical security marks of this type, such as the one disclosed in United States patent application US-A-20030058491, for example.

On the other hand, metamaterials have become one of the most relevant scientific topics today. To better understand the basic electromagnetic properties of metamaterials, it is first necessary to consider how natural media respond to electromagnetic radiation. When the incident electromagnetic radiation on a natural medium (for example, quartz or water) has a wavelength that is much greater than the size of the atoms/molecules (of the order of several Armstrong) that form it, the medium has an effective response that is characterized by two fundamental physical magnitudes: electric permittivity $\epsilon=\epsilon_r\epsilon_0$ ($\epsilon_r$ is the relative permittivity and $\epsilon_0$ permittivity of free space), which models the response of the medium to the electric field; and magnetic permeability $\mu=\mu_r\mu_0$ ($\mu_r$ is the relative permeability and $\mu_0$ the permeability of free space), which models the response of the medium to the magnetic field. Using these magnitudes, the unique properties of the medium found in Maxwell's equations, which can be complex numbers, the refractive index of the medium is defined as $n=(\epsilon_r\mu_r)^{1/2}$ and the impedance of the medium is defined as $\eta=(\mu/\epsilon)^{1/2}$. In the region of dielectric media transparent to optical frequencies (above 100 THz), $\epsilon_r$ is a positive real number greater than 1 whereas $\mu_r=1$ because natural media do not show magnetic activity at optical frequencies. In the case of metals below the plasma frequency (generally in the visible or ultraviolet range), $\epsilon_r$ is a negative number the modulus of which increases inversely to the frequency, and $\epsilon_r=1$.

By using such natural materials with these electromagnetic characteristics it is possible to obtain structures with certain properties or functionalities, such as waveguides, for example, for carrying light between two points in a confined manner. However, there is a limit in terms of the values of the parameters n and $\eta$ that can be obtained because a natural material cannot be altered in terms of its physical nature in order to vary its electromagnetic properties. Therefore, in terms of the design of the structures, it is limited to the values of n and $r_i$ of the materials that can be found in nature. For example, there are no natural materials with magnetic activity at optical frequencies ($\mu_r\neq 1$). In this sense, the design capacity is very limited.

In contrast, a metamaterial is an artificial medium formed by meta-atoms of a much smaller size (at least in the electromagnetic field propagation direction) than the wavelength $\lambda$ of the incident radiation and the electromagnetic response of which depends not only on the electromagnetic properties of the media forming them but on how the aforementioned meta-atoms are structured. In general, said meta-atoms make up a disordered or periodic structure with a certain period $a_i$ (i=x, y, z) in each of the directions of the space, x, y, z. The size of the meta-atoms is much greater than that of a natural atom or molecule, the periods a, also being much greater than the interatomic distance in natural substances. A metamaterial can theoretically be designed such that it has any imaginable value of the effective electric permittivity $\epsilon_r$ and of the magnetic permeability $\mu_r$, from infinite to zero, and both positive and negative values. Accordingly, any imaginable value of the parameters n and $\eta$ can also be obtained. In other words, metamaterials allow synthesizing "custom-made" electromagnetic media.

The origin of metamaterials can be found in a theoretical article published by Russian physicist V. Veselago from 40 years ago [V. G. Veselago, "The electrodynamics of substances with simultaneously negative values of permittivity and permeability," Soy. Phys. Usp. 10, 509 (1968)]. In this document, Veselago studied the inverse properties of ideal electromagnetic media (in the sense that they are homogenous, isotropic and loss-free) with simultaneously negative electric permittivity and magnetic permeability, and it was concluded that if both properties had a negative sign, the refractive index n must as well. Given that at that time there were no natural or artificial materials with these properties (the typical electromagnetic properties of metals and dielectric materials, the most typical substances found in nature in terms of electromagnetic behavior, have already been discussed above), this work remained forgotten for over 30 years until it was salvaged by English scientist Sir John Pendry.

The idea was to develop artificial materials (hence the name metamaterials) the electric and magnetic responses of which could be designed to produce any imaginable value. First, Pendry demonstrated that a three-dimensional lattice of metal wires has a diluted plasmon response, such that the plasma frequency (frequency from which the medium is transparent) depends not on the metal with which the lattice is made but on the periodicity thereof an on the radius of the wires [J. B. Pendry, A. J. Holden, W. J. Stewart, and I. Youngs, "Extremely Low Frequency Plasmons in Metallic Mesostructures," Phys. Rev. Lett. 76, 4773 (1996)]. Shortly thereafter, Pendry proposed that two concentrically split metal rings have a resonant behavior at a certain frequency in which the effective magnetic permeability experiences a very abrupt change, even reaching negative values [J. B. Pendry, A. J. Holden, D. J. Robins, and W. J. Stewart, "Magnetism from conductors and enhanced nonlinear phenomena," IEEE Trans. Microwave Theory Technol. 47, 2075 (1999)]. By mixing both structures, the first experimental demonstration of the negative refraction phenomenon using a metamaterial with $\epsilon_r$, $\mu_r$<0 simultaneously was performed in 2001 at microwave frequencies [R. A. Shelby, D. R. Smith, S. Schultz, "Experimental Verification of a Negative Index of Refraction," Science 292, 77-79 (2002)]. In general, it can be said that the first custom-designed metamaterial having a refractive index n and which was impossible to obtain with a natural media was made.

In the microwave regimen, the periods a, are of the order of centimeters or millimeters. Through the scaling properties of Maxwell's equations, it can be considered that by reducing those periods a, to orders of micrometers or hundreds of nanometers, it is possible to obtain metamaterials with a "custom-made" response at optical frequencies (visible, infrared). This is true only in part because the metals used to build the metamaterial in the aforementioned paper by Shelby et al. behave like perfect conductors in microwaves whereas at optical frequencies they are characterized by the existence of surface plasmons which complicate making metamaterials at such high frequencies. Furthermore, for other reasons there is a maximum frequency at which a magnetic response can be obtained with the ring resonators proposed by Pendry due to the saturation of the magnetic response [J. Zhou, T H. Koschny, M. Kafesaki, E. N. Economou, J. B. Pendry and C. M. Soukoulis, "Saturation of the negative magnetic response of split-ring resonators at optical frequencies," Phys. Rev. Lett. 95, 223902 (2005)]. In addition to the foregoing, the difficulty in manufacturing meta-atoms having such small sizes requiring very complex and advanced nanomanufacturing processes must be taken into account. Accordingly, making three-dimensional metamaterials with a magnetic response at optical frequencies (mainly near-infrared and visible) is still a challenge. It must be pointed out that metamaterials are the only way to produce magnetic activity ($\mu_r \neq 1$) at optical frequencies at which all natural materials are inert to the magnetic field.

However, different experiments have demonstrated the possibility of making planar metamaterials, i.e., two-dimensional materials having one or several layers with a magnetic response at optical frequencies [T. J. Yen, W. J. Padilla, N. Fang, D. C. Vier, D. R. Smith, J. B. Pendry, D. N. Basov, and X. Zhang, "Terahertz Magnetic Response from Artificial Materials," Science 303, 1494-1496 (2004); V. M. Shalaev, "Optical negative-index metamaterials," Nat. Photon. 1, 41-48 (2007); S. Zhang, W. Fan, A. Frauenglass, B. Minhas, K. J. Malloy and S. R. J. Brueck, "Demonstration of Mid-Infrared Resonant Magnetic Nanostructures Exhibiting a Negative Permeability," Phys. Rev. Lett. 94, 037402 (2005)]. Despite the slenderness in terms of wavelengths of said layers of metamaterial, extraction algorithms of the parameters $\epsilon_r$ and $\mu_r$, determined univocally from the transmission and reflection measurements upon illuminating the aforementioned layer with both normal and oblique incidence can be used. Said algorithms are described in depth in several articles: [D. R. Smith, S. Schultz, P. Markos, and C. M. Soukoulis, "Determination of effective permittivity and permeability of metamaterials from reflection and transmission coefficients," Phys. Rev. B 65, 195104 (2002); C. Menzel, C. Rockstuhl, T. Paul, F. Lederer, and T. Pertsch "Retrieving effective parameters for metamaterials at oblique incidence", Phys. Rev. B 77, 195328 (2008)]. By using this method it has been possible to determine that said layers have an exclusive behavior of metamaterials, including a relative permeability different from 1 at optical frequencies.

In a recent design the feasibility of obtaining a simultaneous electric and magnetic response in the visible spectrum has been theoretically demonstrated using a silver metamaterial without needing to simultaneously use split-ring resonators and metal strips [C. Garcia-Meca, R. Orturio, R. Salvador, A. Martinez, and J. Marti, "Low-loss single-layer metamaterial with negative index of refraction at visible wavelengths," Opt. Express 15, 9320-9325 (2007)].

Document WO-A-2008/110775 discloses security marks based on different structures of metamaterials and essentially corresponding to two types of configurations: one for refraction and the other for diffraction of radiations in the terahertz range (wavelength of 3 mm to 15 μm) or infrared range (wavelength greater than 750 nm). Even though the metamaterials present in these structures provide responses in diffraction and/or refraction different from those of natural media in said diffraction and refraction configurations, they have the drawback that those responses are imitable using materials of another type such as, for example, photonic crystals (periodic dielectric structures).

Document WO-A-2006023195 discloses metamaterials for use in optical devices such as lenses formed from a plurality of unit cells at least a portion of which has an electromagnetic permeability different from others and arranged such that the material has a gradient index such that a continuous variation of the permeability takes place, which does not allow forming an effective matrix security code which would be required of a discrete variation of the permeability.

DESCRIPTION OF THE INVENTION

The object of the present invention is an optical security mark which can be applied to at least part of an object, intended to overcome the drawbacks of the security marks of the state of the art, and comprising at least one structure comprised by at least one metamaterial with magnetic response in which the relative magnetic permeability is different from 1 ($\mu_r \neq 1$) at optical frequencies. Said magnetic response produces a certain spectral signature when at least part of the metamaterial is subjected to an incident radiation of a particular wavelength λ, such that a specific code assigned to said metamaterial and consisting of the value of the relative permeability at that wavelength (type I code assignment or coding) is defined;

It can also be established that the code is given by the value of the wavelength λ in which the metamaterial has a particular relative magnetic permeability $\mu_r$ (type II code assignment or coding).

The metamaterial is selected from metamaterials generating magnetic responses ($\mu_r \neq 1$) for at least one incident radiation with a wavelength (λ) in the ultraviolet to near-infrared spectrum (range of 15 nm to 1100 nm).

In a first embodiment of the invention (type I embodiment), the optical security mark comprises a plurality of meta-atoms (basic unit of a metamaterial), arranged coplanarly forming a layer of metamaterial. The incident radiation can be perpendicular to the plane on which said meta-atoms are located or they can form a certain angle therewith.

The mark of this type I embodiment has transverse dimensions ($b_x$, $b_y$) in the plane on which the meta-atoms are located, wherein:

$b_x$ is a first transverse dimension in a first transverse extension of the metamaterial $b_y$ is a second transverse dimension in a second transverse extension of the metamaterial.

Furthermore, the mark can be formed by a disordered or periodic structure (metamaterial). In the periodic case, ($b_x$, $b_y$) will be defined by the formulas $$b_x=N_xa_x$$

wherein $N_X$ is the number of meta-atoms in the first transverse extension and $a_x$ is the periodicity of the meta-atoms in said first transverse extension; and $$b_y=N_ya_y$$

wherein $N_y$ is the number of meta-atoms in the second transverse extension and $a_y$ is the periodicity of the meta-atoms in said second transverse extension.

In the dimension z corresponding to the one single longitudinal dimension, perpendicular to $b_x$, $b_y$, in a single longitudinal extension of the metamaterial, the mark according to this embodiment of the invention comprises a single layer having thickness $a_z$.

According to the invention, $N_X$ and $N_y$ can have a value at least greater than 3 and preferably greater than 10.

In the case in which the mark of this type I embodiment is formed by a disordered or aperiodic structure (metamaterial), ($b_x$, $b_y$) will be the dimensions of the minimum bounding rectangle, located in the plane on which the meta-atoms are arranged, enclosing all these meta-atoms.

In both cases (periodic and disordered structure), both the aforementioned first transverse dimension and the second transverse dimension are at least equal to the wavelength of the incident radiation.

In a second embodiment (type II embodiment), the plurality of meta-atoms can extend in the three directions of space. In this case, the mark will have dimensions ($b_x$, $b_y$, $b_z$), $b_x$, $b_y$ being defined as before and $b_z$ being a single longitudinal dimension, perpendicular to $b_x$, $b_y$, in a single longitudinal extension of the metamaterial.

Like in the type I embodiment, the mark can be formed by a periodic (metamaterial) structure, in which case $b_x$ and $b_y$ will be defined as before and $b_z$ will be defined by the formula:

$$b_z=N_za_z$$

wherein $N_Z$ is the number of meta-atoms or layers of metamaterial in the single longitudinal direction and $a_z$ is the periodicity of the meta-atoms in said longitudinal direction.

The mark of the type II embodiment can also be formed by a disordered or aperiodic (metamaterial) structure, in which case ($b_x$, $b_y$, $b_z$) are the dimensions of the minimum bounding rectangular prism enclosing all the meta-atoms forming the mark.

In both cases (periodic and disordered structure), both the first aforementioned transverse dimension and the second transverse dimension are at least equal to the wavelength of the incident radiation. In a third embodiment of the invention (type III embodiment), the optical security mark comprises a two-dimensional logical matrix of L rows and M columns, where each of its elements is a type I or II embodiment. The spatial arrangement of the elements of said matrix will depend on the particular application and they do not have to be located in the same plane or organized in the form of rows and columns, despite the fact that the elements are logically grouped in rows and columns.

Each type I or II embodiment represents a particular code. Therefore, a type I or II embodiment alone represents only one code whereas the type III embodiment represents an amount of codes equal to the number of elements of the matrix. The assignment of the code which represents each type I or II embodiment could be done in two different ways, as discussed above. In the first way (type I code assignment), the value of the permeability of each element (l,m) of the matrix is univocally related to the value of the code of said element according to the formula $\mu_{ri,m}(\lambda)$, wherein $1\leqq I\leqq L$ and $1\leqq,m\leqq M$, and wherein I is a natural number comprised between 1 and L, L is the number of rows of the logical matrix based on which the elements having dimensions $b_x$(l,m) and $b_y$(l,m) forming the mark are organized, m is a natural number comprised between 1 and M, and M is the number of columns of the logical matrix based on which the elements having dimensions $b_x$(l,m), $b_y$(l,m) forming the mark are organized.

In the second way of assigning codes (type II code assignment), the code corresponding to each type I or II embodiment is determined univocally from the wavelength at which said embodiment generates a certain value of $\mu_r$ belonging to a particular expected range of values, instead of by the specific value of $\mu_r$ at a particular wavelength. So the code will be given by the formula $\mu_{l,m}(\mu_r)$.

Therefore a mark represents one or several specific codes corresponding to the formula $\mu_r(\lambda)$ or $\lambda(\mu_r)$ wherein $\mu_r$ is the relative magnetic permeability of each type I or II structure forming the mark and $\lambda$ is the wavelength of the incident radiation with a value comprised between 15 nm and 1100 nm.

Finally, the two ways of assigning prior codes could be combined to create more complex or more technologically suitable codes.

In a type III embodiment, the sizes $b_x$, $b_y$ and $b_z$, as well as the number of meta-atoms $N_x$, $N_y$ and $N_z$ (and the periodicities $a_x$, $a_y$ and t in the periodic case), could be different for each element of the matrix if necessary.

The optical security mark according to the invention can also be designed to give a magnetic permeability response at least at only one wavelength ($\lambda$) in the near-infrared spectrum (i.e., in the range of 0.78 micrometers to 1.1 micrometers of the incident radiation), at least at only one wavelength of the light visible spectrum (range of 0.38 micrometers to 0.78 micrometers of the incident radiation), or to give only a magnetic permeability response at least at only one wavelength in the ultraviolet spectrum (range of 15 nanometers to 380 nanometers of the incident radiation).

Also according to the invention, at least part of the meta-atoms is made up of at least one metal material (gold, silver, aluminum, etc.) or a dielectric material. At least part of the meta-atoms can be comprised by meta-atoms of silver or another noble metal such as, for example, meta-atoms like the type described in the article by C. Garcia Meca et al. identified above in the present specification.

In view of the foregoing, the present invention relates to an optical security mark formed by one or several structures the electromagnetic response of which to the incident light allows verifying the authenticity of the object in which said element is inserted. The structures forming the mark consisting of metamaterials designed and manufactured to have a magnetic response which cannot be produced by natural media. Specifically, the aforementioned structures of metamaterials will have an effective magnetic permeability different from 1 at optical frequencies. The value of the magnetic permeability or the frequency at which they take place, which can be obtained from the transmission/reflection spectra (or spectral signatures) of the mark, are a code identifying the material. Therefore, the only way to produce the desired response (spectral signature) is to achieve that magnetic activity (code), so the response cannot be mimicked or counterfeited by using other alternative structures, conferring a high degree of protection to the object in which the structure is applied.

The optical security mark according to the present invention is virtually impossible to counterfeit because the magnetic response or spectral signature it provides at a certain illumination is unique and can only be imitated with another structure of metamaterials, but not with a natural medium. If said spectral signature is produced at very high frequencies (very small wavelength λ, with λ=c/f, where c is the speed of light in empty space and f the frequency), in order to produce such spectral signature a metamaterial with periods $a_i$ that are much smaller than λ (at least in the direction of incidence of the radiation) is necessary. For example, in order for a metamaterial with magnetic activity at λ=600 nm to have an effective behavior, it is necessary for its period in the direction of incidence to be at most λ/3, i.e., less than 200 nm. Furthermore, in order to achieve a magnetic activity at such a high frequency the minimum details of the metamaterial must be even smaller. Therefore, it is necessary to manufacture a meta-atom with a certain physical configuration having a size of less than these 200 nm, which is difficult to achieve, even with the current nanomanufacturing tools, even more so if metamaterials are to be manufactured by means of processes allowing mass production. This characteristic is very important in the optical security technique proposed herein. In view of the fact that to manufacture such metamaterial the most advanced technological tools are necessary, the spectral signature could not be imitated using less advanced technological means, which contributes to preventing counterfeiting.

Another object of the present invention is a method for authenticating a security mark such as the one defined above in the present invention, which comprises

- subjecting at least part of the security mark to an incident radiation with at least a wavelength or range of wavelengths (λ) with values comprised between 15 nm and 1100 nm;
- determining the relative magnetic permeability ($\lambda_r$) of the security mark in response to said incident radiation at the wavelength or wavelengths necessary for obtaining the value of the code corresponding to said permeability (measured code) according to the formula $\mu_r(\lambda)$ in the case of type I code assignment or $\lambda(\mu_r)$ in the case of type II code assignment. Obtaining the so-called measured code with this information;
- comparing said measured code with a certain specific known authentication code (expected code);
- discarding the authenticity of the security mark when the value of the measured code in response to said incident radiation does not coincide with the expected code;
- accepting the authenticity of the security mark when the value of the measured code in response to said incident radiation coincides with the expected code.

In the event that the mark is a type III embodiment, it will be necessary to carry out the preceding steps for each of the type I and/or type II embodiments forming the mark. The interpretation of the degree of authenticity of the mark depending on the number of measured codes which coincide with their corresponding expected code will depend on the specific application.

The extraction of the permeability can be done according to known methods, such as those described in the relevant documents of the state of the art identified above for example.

Finally, the present invention also relates to the use of a security mark such as that defined above in the present specification as a security mark applied to an object.

BRIEF DESCRIPTION OF THE DRAWINGS

Aspects and embodiments of the invention are described below based on drawings, in which.

Figure 1:
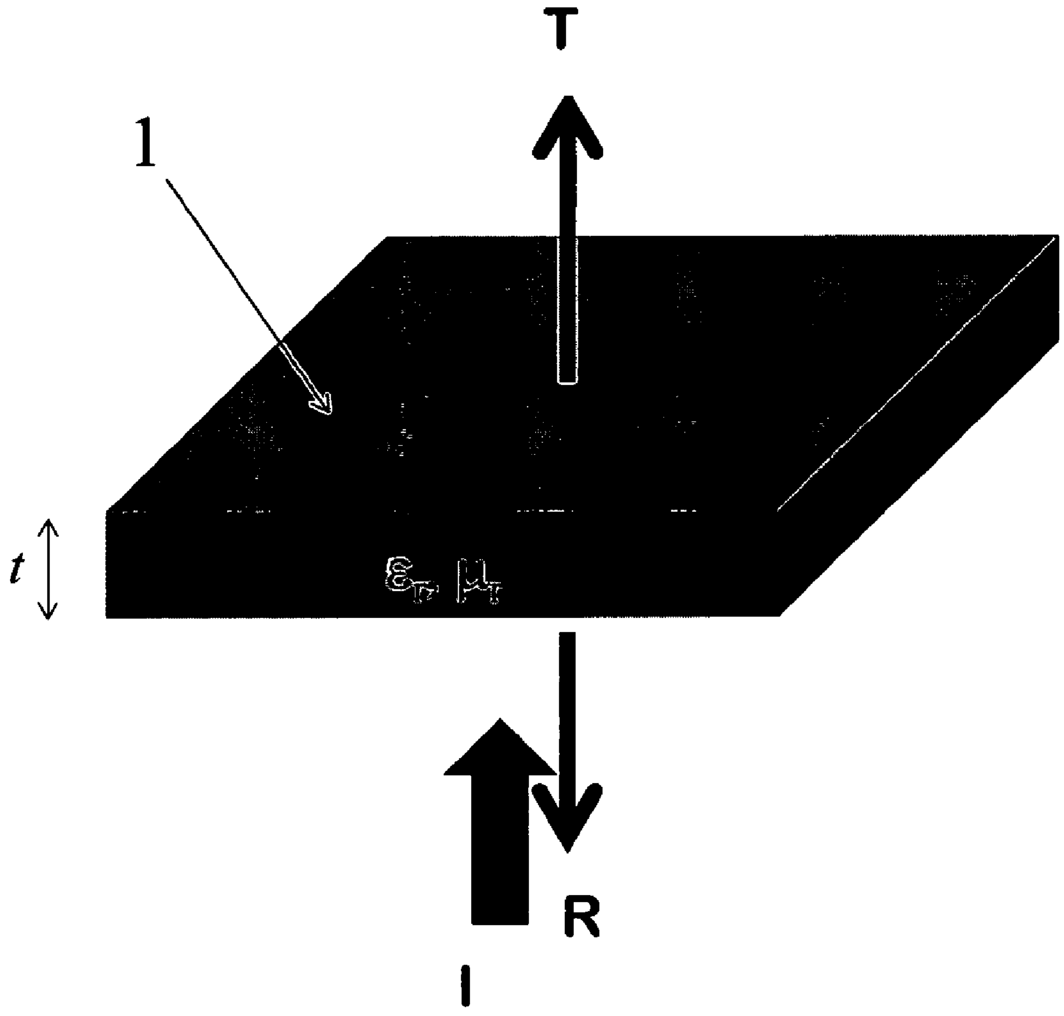
FIG. 1 is an explanatory schematic view of the parameters to be taken into account when a optical security mark formed by a natural medium is exposed to illumination.

The following alphanumerical legends can be seen in these figures:

1 natural medium planar structure in layer form of a metamaterial medium

2M1, 2M2 . . . 2Mz layers of metamaterial

3 meta-atom

4 incident light

5 transmitted light

6 reflected light $a_x$ periodicity of the meta-atoms 3 in the first transverse extension $a_y$ periodicity of the meta-atoms 3 in the second transverse extension $a_z$ periodicity of the meta-atoms 3 in the vertical extension (thickness of the metamaterial)

$b_x$ first transverse dimension in a first transverse extension of the layer 2 of metamaterial $b_y$ second transverse dimension in a second transverse extension of the layer 2 of metamaterial $b_z$ vertical extension (thickness of the metamaterial)

I incident light (I)

I natural number comprised between 1 and L,

L number of rows of the matrix the elements of which, having dimensions $b_x$(l,m) $b_y$(l,m), form the mark m natural number comprised between 1 and M M number of columns of the matrix the elements of which, having dimensions $b_x$(l,m) $b_y$(l,m), form the mark $N_X$ number of meta-atoms 3 in the first transverse extension $N_y$ number of meta-atoms 3 in the second transverse extension $N_z$ number of layers 2 of stacked meta-atoms 3 in the vertical extension of the metamaterial R reflection of the incident light t thickness of the natural medium T transmission of the incident light $\epsilon_r$ electric permittivity $\mu_r$ magnetic permeability λ wavelength of the incident light ϕ angle formed by the incident radiation with the plane on which the meta-atoms of a certain embodiment are located.

WAYS OF CARRYING OUT THE INVENTION

FIG. 1 schematically shows the particular case of a natural medium (1) assumed to be infinite in its transverse dimensions, having thickness t, electric permittivity $\epsilon_r$, and magnetic permeability $\mu_r$, which is illuminated with a light (I) having wavelength λ. For the sake of simplicity, normal incidence and no losses ($\epsilon_r$, $\mu_r$ are real) are assumed. The responses in transmission (T) and reflection (R) will depend on the wavelength λ of the incident radiation (I) in the infrared, visible or ultraviolet spectrum, the thickness of the medium t, the electric permittivity $\epsilon_r$, and the magnetic permeability $\mu_r$. The parameters $\epsilon_r$ and $\mu_r$ can be extracted from said responses univocally. If $\mu_r=1$ (like it always is in the case of a natural medium at optical frequencies) the responses T and R (spectral signature of the natural medium) can be achieved in several ways when natural media are used (for example by stacking layers having thicknesses that are much smaller than the wavelength and any effective permittivity can be achieved with different permittivities). Therefore, the spectral signature can be counterfeited when a natural medium is used.

Figure 2A:
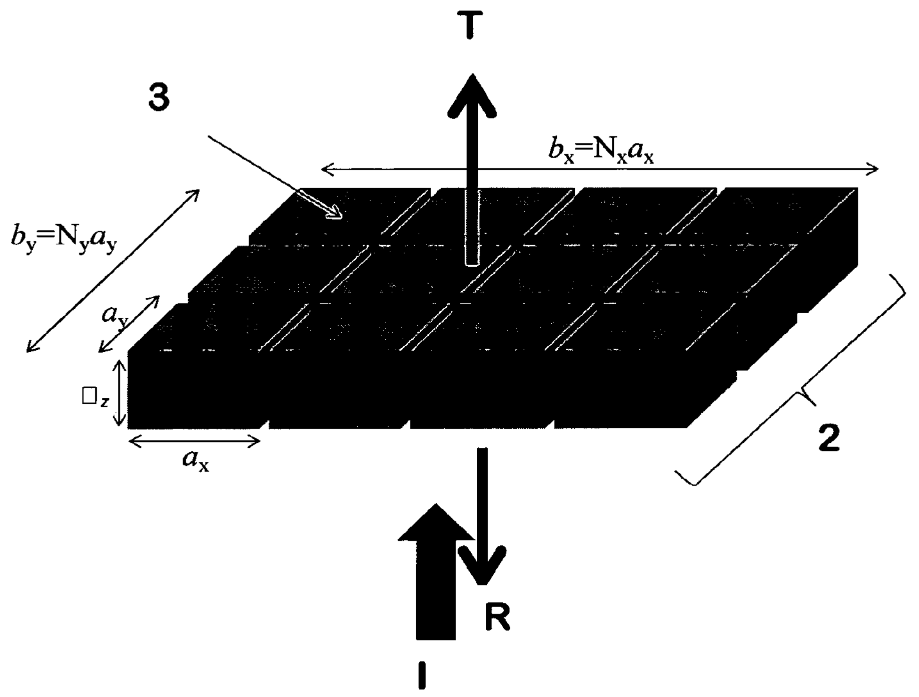
FIG. 2 is a schematic view of a type I embodiment of a security mark according to the present invention for cases of normal incidence [FIG. 2(*a*)] and oblique incidence [FIG. 2(*b*)] with a certain angle cp with respect to the normal to the plane on which the meta-atoms are located.
Figure 2B:
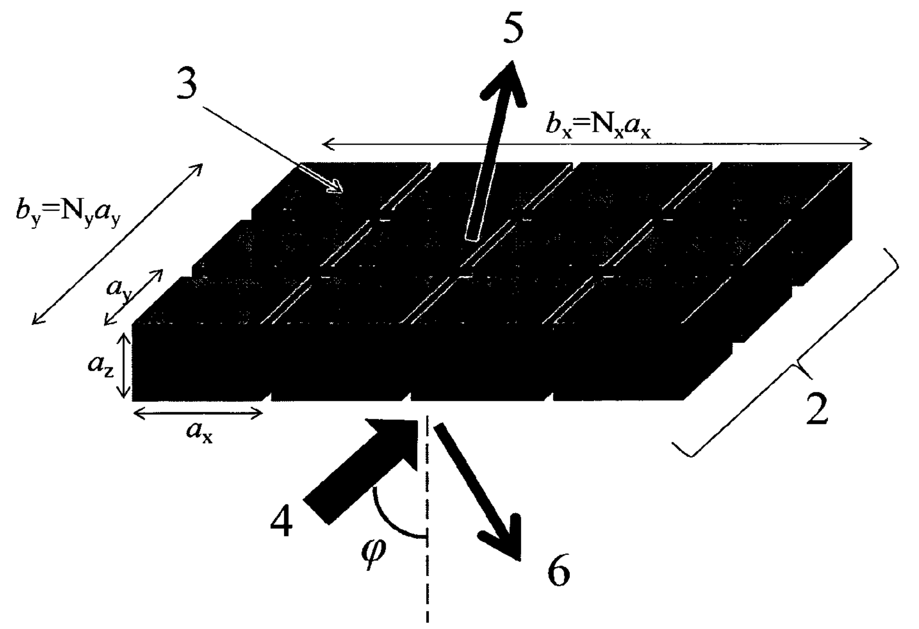

FIG. 2 schematically shows a planar structure (2) in layer form of a metamaterial medium according to a type I embodiment of the mark contemplated in the present invention, in its periodic version. FIG. 2(*a*) represents the case of normal incidence to the plane on which the meta-atoms are located and FIG. 2(*b*) represents the case of oblique incidence. This structure has a thickness $a_z$ and is made up of a periodic and infinite distribution of meta-atoms (3) with periods $a_x$ and $a_y$ in the respective transverse dimensions ($b_r$, $b_y$) of the layer (2) of metamaterial at the incidence of the incident radiation (I) in the near-infrared, visible or ultraviolet spectrum. Said transverse dimensions ($b_x$, $b_y$) of the metamaterial (2) are thus defined respectively by the formulas $$b_x=N_xa_x$$

wherein $b_x$ is a first transverse dimension in a first transverse extension of the layer (2) of metamaterial, $N_x$ is the number of meta-atoms (3) in said first transverse extension and $a_x$ is the periodicity of the meta-atoms (3) in said first transverse extension; and $$b_y=N_ya_y$$

wherein $b_y$ is a second transverse dimension in a second transverse extension of the layer (2) of metamaterial, $N_y$ is the number of meta-atoms (3) in said second transverse extension and $a_y$ is the periodicity of the meta-atoms (3) in said second transverse extension.

When the structure is illuminated with a particular incidence (I), a transmitted signal (T) and another reflected signal (R) are produced which give the spectral signature. The composition of the meta-atoms (3) (having volume $a_xa_ya_z$) can be any composition provided that the response of the layer of metamaterial (2) provides a certain effective electric and magnetic response (spectral signature) at the wavelength λ of the incident radiation (I). A minimum number ($N_x$, $N_y$) of meta-atoms (3) assuring an effective response of the layer (2) of metamaterial must be included in the transverse dimensions ($b_r$, $b_y$). In other words, $b_x=N_xa_x$ and $b_y=N_ya_y$ must be at least equal to λ. The electric permittivity $\epsilon_r$ and the magnetic permeability $\mu_r$ can be obtained from the responses T and R univocally by inverse extraction. Given that, even by using natural materials it is possible to obtain multiple positive values (dielectric materials) and negative values (metals) for the electric permittivity $\epsilon_r$, the parameter which produces a particular spectral signature at a particular wavelength is the relative magnetic permeability $\mu_r$. Then an identifier code (fingerprint) $\mu_r(A)$ is assigned to the layer (2) of metamaterial having size $b_xb_ya_z$ (FIG. 2) in block form. If $\mu_r$ is different from 1, the matched pair [T, R] that is produced can only be achieved using a suitable metamaterial.

Figure 3:
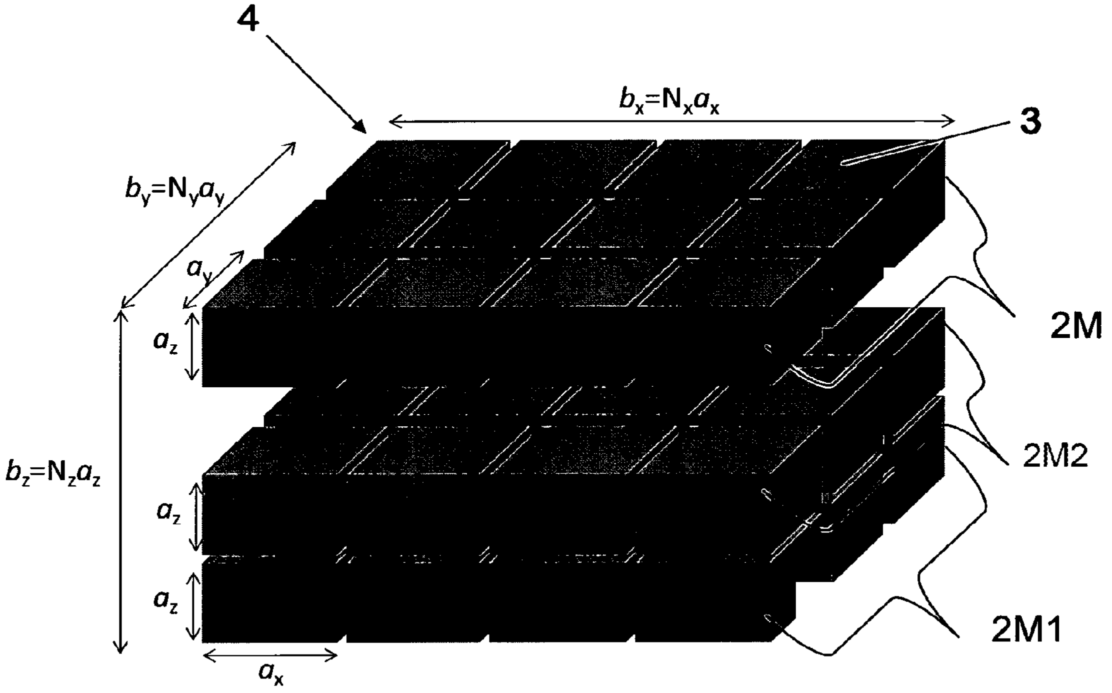
FIG. 3 is a schematic view of a type II embodiment of a security mark according to the present invention consisting of several stacked layers of embodiments I or II.

FIG. 3 shows a type II embodiment of the invention, in its periodic version, whereby the spectral signature $\mu_r(A)$ is achieved by means of stacking a plurality of identical layers (2M1, 2M2 . . . 2Mz) of metamaterial, each having a vertical dimension $a_z$ corresponding to the thickness of the layer. In this case the optical security structure is made up of $N_xN_yN_z$ meta-atoms (3), and the multilayer structure (4) made up of layers M1, M2 . . . Mz of the metamaterial (2) has a vertical dimension corresponding to the formula:

$$b_z=N_za_z$$

wherein $N_z$ is the number of layers (2) of stacked meta-atoms (3) in the vertical extension of the metamaterial and $a_z$ is the vertical dimension corresponding to the thickness of each of the stacked meta-atoms (3) in the vertical direction.

Figure 4:
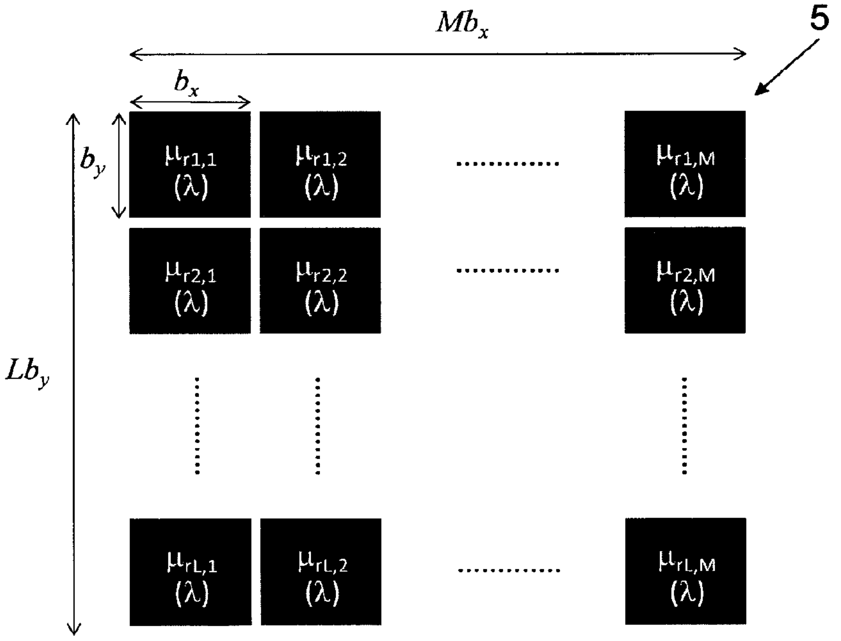
FIG. 4 is a schematic view of a matrix of security marks (type III embodiment) which can be formed with a set of marks corresponding to type I or II embodiments such as those illustrated in FIGS. 2 and 3. In this case a type I code assignment is used.
Figure 5:
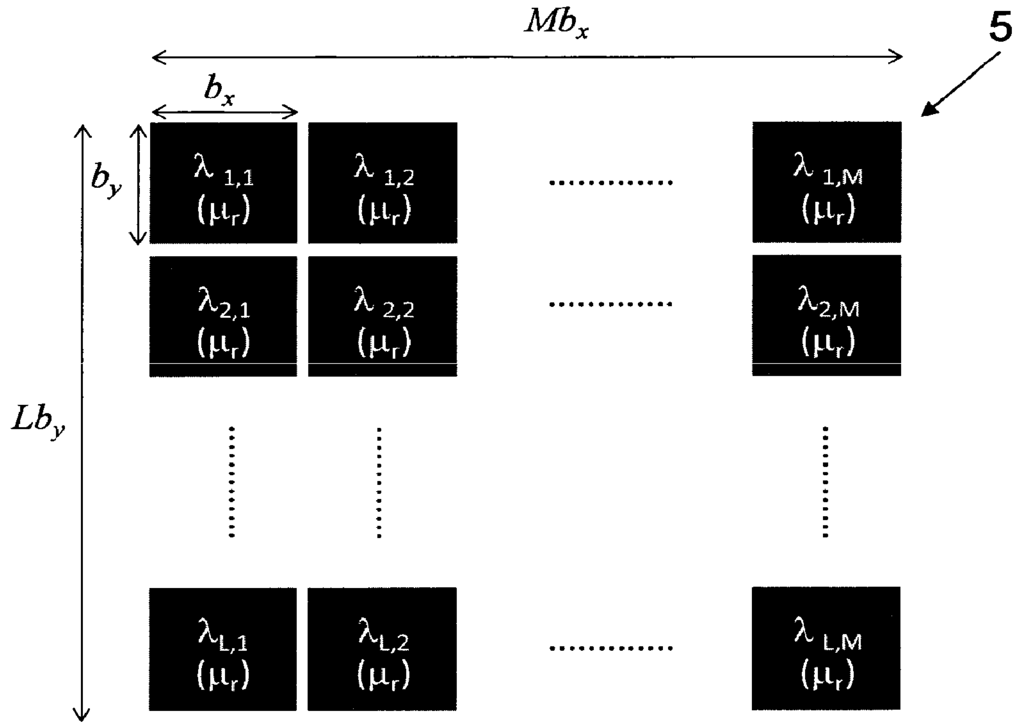
FIG. 5 is a schematic view of a matrix of security marks (type II embodiment) which can be formed with a set of marks corresponding to type I or II embodiments such as those illustrated in FIGS. 2 and 3. In this case a type II code assignment is used.

In order to attain a higher degree of protection, a matrix (5) of structures of metamaterial having M×L elements such as those shown in FIGS. 2 and/or 3 can be built, such that they lead to a matrix code, i.e., a matrix of numerical elements, each with a code $\mu_{rl,m}(\lambda)$ or $\lambda_{l,m}(\mu_r)$, where $1\leqq I\leqq L$ and $1\leqq m\leqq M$, where I is a natural number comprised between 1 and L, L is the number of rows of the matrix the elements of which, having dimensions $b_x$(l,m), $b_y$(l,m), form the mark, m is a natural number comprised between 1 and M, and M is the number of columns of the matrix the elements of which, having dimensions $b_x$(l,m), $b_y$(l,m), form the mark, as proposed in FIGS. 4 and 5. The conditions of illumination and of the generation of the transmission and reflection signals would be similar to those shown in FIGS. 2 and 3.

Figure 6:
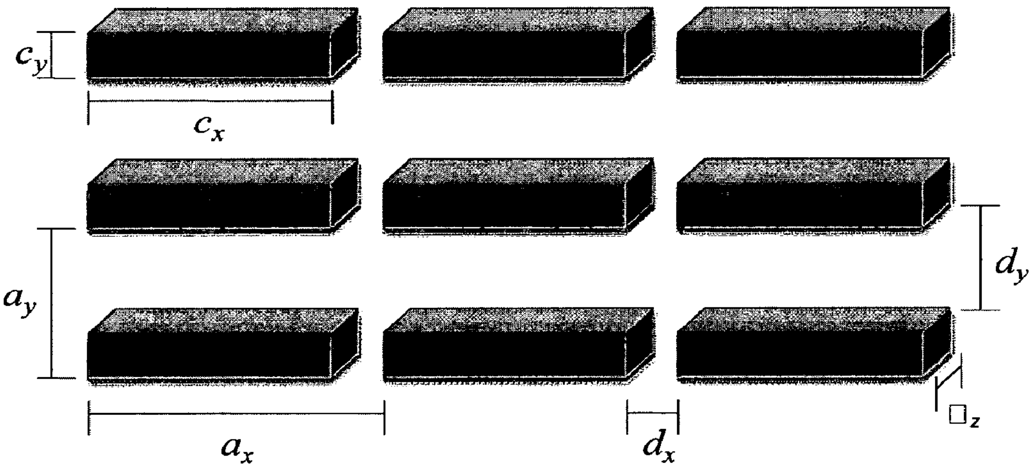
FIG. 6 is a schematic view of a metamaterial mark formed according to the mark of FIG. 2.
Figure 7:
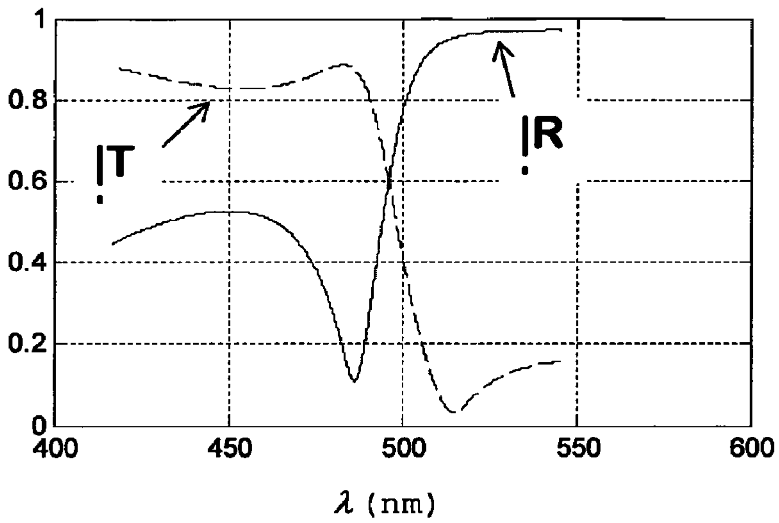
FIG. 7 is a graph showing the absolute value of the spectral signature (transmission T and reflection R) that is obtained when illuminating the layer of metamaterial illustrated in FIG. 5 with white light at a normal incidence.
Figure 8:
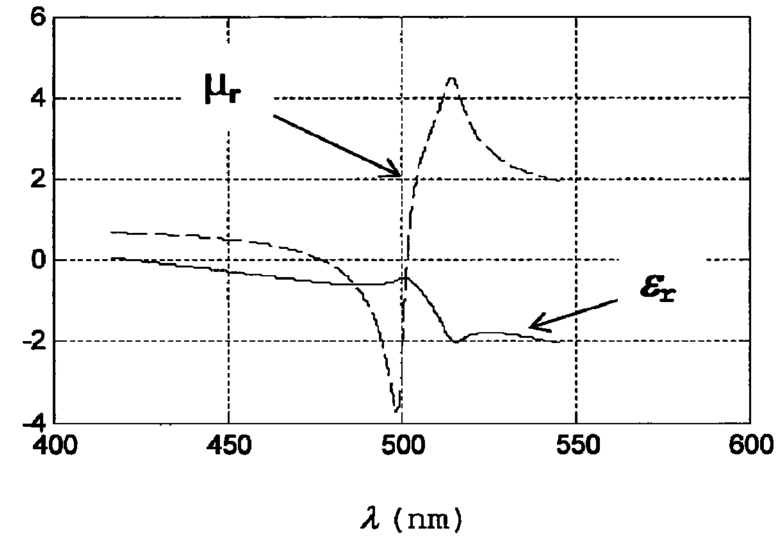
FIG. 8 is a graph showing the parameters $\mu_r(\lambda)$ and $\epsilon_r(\lambda)$ extracted from the spectral signature the absolute value of which is shown in FIG. 7.

FIG. 6 schematically shows an embodiment of the invention, wherein the meta-atom (3), the periodic repetition of which forms the metamaterial (FIGS. 2 and 3 show 3×3 meta-atoms, i.e. $N_x=N_y=3$), is a silver parallelepiped having dimensions $a_x=250$ nm, $a_y=322$ nm, $d_x=30$ nm, $d_y=212$ nm, $C_x=220$ nm and $C_y=t=110$ nm When the layer of metamaterial of FIG. 6 is illuminated with white light at normal incidence, a spectral signature (transmission T and reflection R) is obtained, the absolute value of which is shown in FIG. 7. FIG. 8 shows the parameters $\mu_r(A)$ and $\epsilon_r(A)$ extracted from the spectral signature the absolute value of which is shown in FIG. 7. The specific code produced by the metamaterial is the value of $\mu_r$ at a particular wavelength λ or the value of λ at which a certain $\mu_r$, which cannot be reproduced by other means, occurs, conferring the property of optical security to the layer of metamaterial.

The invention claimed is:

1. An optical security mark is applied to at least part of an object, comprising at least one structure comprised by at least one metamaterial made up of a plurality of meta-atoms forming a structure, and having transverse dimensions in a plane on which meta-atoms are located, defined by the formula $$(b_x, b_y)$$

wherein:

$b_x$ is a first transverse dimension in a first transverse extension of the metamaterial and $b_y$ is a second transverse dimension in a second transverse extension of the metamaterial, different from the first transverse dimension, wherein the metamaterial is selected from metamaterials generating magnetic responses with a relative magnetic permeability ($\mu_r$) different from 1 at least at an incident radiation (I) selected from incident radiation with normal incidence or with oblique incidence and with at least a wavelength ($\lambda$) in a spectrum ultraviolet to near-infrared in a range of 0.15 micrometers to 1.1 micrometers, said magnetic responses produce a spectral signature when at least part of the metamaterial is subjected to said incident radiation (I) of the aforementioned wavelength or at wavelengths belonging to the same range, such that said spectral signature corresponds to at least one specific code assigned to said metamaterial, said specific code being: a value of the relative magnetic permeability at a wavelength ($\lambda$) of an incident radiation (I) according to formula $$\mu_r(\lambda)$$

wherein $\mu_r$ is the relative magnetic permeability and ($\lambda$) is the wavelength of the incident radiation, or the value of the wavelength ($\lambda$) at which the metamaterial has a particular relative magnetic permeability ($\mu_r$) according to formula $$\lambda(\mu_r)$$

wherein $\lambda$ and $\mu_r$ have the meanings indicated above, and combinations of at least one specific permeability code and at least one specific wavelength code ($\lambda$), and in that said first transverse dimension and said second transverse dimension are each at least equal to the wavelength ($\lambda$) of the incident radiation.

2. The optical security mark according to claim 1, wherein at least part of the meta-atoms forms a periodic structure and in that the dimensions of said structure are defined by the formulas $$b_x=N_x a_x$$

wherein $N_x$ is the number of meta-atoms in the first transverse extension and $a_x$ is the periodicity of the meta-atoms in said first transverse extension; and $$b_y=N_y a_y$$

wherein $N_y$ is the number of meta-atoms in the second transverse extension and $a_y$ is the periodicity of the meta-atoms in said second transverse extension.

3. The optical security mark according to claim 1, wherein at least part of the meta-atoms forms an aperiodic structure contained in a minimum bounding rectangle with said transverse dimensions ($b_x$, $b_y$), located in the plane on which the meta-atoms are arranged, enclosing said part of the meta-atoms.

4. The optical security mark according to claim 1, wherein the plurality of meta-atoms has dimensions $$b_x, b_y, b_z$$

wherein $b_x$, $b_y$ are said transverse dimensions, and $b_z$ is a vertical dimension perpendicular to said transverse extensions ($b_x$, $b_y$) corresponding to the thickness of said plurality of meta-atoms.

5. The optical security mark according to claim 4, wherein at least part of the meta-atoms in the mark forms a periodic structure, wherein said vertical dimension is defined by the formula:

$$b_z=N_z a_z$$

wherein $N_z$ is a number selected from the number of meta-atoms in the vertical dimension and the number of layers forming the metamaterial and $a_z$ is the periodicity of the meta-atoms in said vertical dimension.

6. The optical security mark according to claim 4, wherein at least part of the meta-atoms in the mark forms an aperiodic structure, wherein said transverse dimensions and said vertical dimension ($b_x$, $b_y$, $b_z$) defines a minimum bounding rectangular prism enclosing all the meta-atoms forming said part of the mark.

7. The optical security mark according to claim 2, wherein the number of meta-atoms ($N_x$) in said first transverse extension and the number of meta-atoms in said second transverse extension ($N_y$) each have a value at least greater than 3, preferably greater than 10.

8. The optical security mark according to claim 1, wherein said security mark comprises a plurality of meta-atom structures each of which has a specific code and which are logically organized in matrix forms with a number of rows (L) and a number of columns M, such that each of the aforementioned structures is an element of said matrix, the element belonging to row I and column (m) being identified by the matched pair (l,m), such that each row has a number M of elements, the last row of the matrix being able to have a number of elements less than M such that the total number of structures of the matrix can have any natural value, and each structure or element (l,m) has a value $\mu_{rl,m}(\lambda)$ of relative magnetic permeability.

9. The security mark according to claim 8, wherein the values $\mu_{rl,m}$ of magnetic permeability of the meta-atom structures defines a matrix code selected from:

at least one matrix code of relative magnetic permeability wherein the value $\mu_{rl,m}$ of relative magnetic permeability of each element of the matrix is univocally related to the value of the code of said element according to the formula $$\mu_{rl,m}(\lambda)$$

wherein $1 \leqq I \leqq L$ and $1 \leqq m \leqq M$,

I is a natural number comprised between 1 and L,

L is the number of rows of the matrix the elements of which are the structures having dimensions $b_x$(l,m), $b_y$(l,m), m is a natural number comprised between 1 and M, and M is the number of columns of the matrix the elements of which are the structures having dimensions $b_x$(l,m), $b_y$(l, m);

at least one matrix code having a wavelength determined univocally from the wavelength at which each element of the matrix (5) generates a particular value of relative magnetic permeability $\mu_{rl,m}$ belonging to a particular expected range of values, instead of by the specific value of the relative magnetic permeability $\mu_{rl,m}$ at a particular wavelength, said specific set code being defined by the formula $$\lambda_{l,m}(\mu_r)$$

wherein $\lambda$, l, m and $\mu_r$ have the meanings defined above; and at least one combined matrix code based on a combination of a specific relative magnetic permeability set code and a specific wavelength set code.

10. The optical security mark according to claim 7, wherein at least one of the dimensions ($b_x$, $b_y$, $b_z$) of at least one structure in the matrix (5) is different from that of other structures.

11. The optical security mark according to claim 7, wherein at least one structure in the matrix (5) comprises a number of meta-atoms ($N_x$, $N_y$, $N_z$) different from that of other structures.

12. The optical security mark according to claim 7, wherein the periodicity ($a_x$, $a_y$, $a_z$) of the meta-atoms of at least one structure in the matrix (5) is different from that of other structures.

13. The optical security mark according to claim 1, wherein said security mark is designed to give a magnetic permeability response at least at a wavelength ($\lambda$) in the spectrum of 0.78 micrometers to 1.1 micrometers of the incident radiation.

14. The optical security mark according to claim 1, wherein said security mark is designed to give a magnetic permeability response at least at a wavelength ($\lambda$) in the spectrum of 0.38 micrometers to 0.78 micrometers of the incident radiation.

15. The optical security mark according to claim 1, wherein said security mark is designed to give a magnetic permeability response at least at a wavelength of 15 nanometers to 380 nanometers of the incident radiation.

16. The optical security mark according to claim 1, wherein at least part of the meta-atom structures is comprised by at least a metamaterial from meta-atoms of metals, meta-atoms of dielectric materials and combinations of such meta-atoms.

17. The optical security mark according to claim 1, wherein at least part of the meta-atom structures is comprised by meta-atoms of a noble metal.

18. The optical security mark according to claim 17, wherein the noble metal is silver.

19. An authentication method for authenticating the security mark defined in claim 1, wherein said method comprises subjecting at least part of the security mark to an incident radiation with at least a wavelength or range of wavelengths ($\lambda$) with values comprised between 150 nm and 1100 nm;

determining the relative magnetic permeability ($\mu_r$) of the security mark in response to said incident radiation at the wavelength or wavelengths necessary for obtaining the value of at least one measured code selected from a measured magnetic permeability code corresponding to at least a value of the relative magnetic permeability at the wavelength ($\lambda$) of the incident radiation (I) according to the formula $\mu_r(\lambda)$, wherein $\lambda$ and $\mu_r$ have the meanings indicated above, and a measured wavelength code corresponding to the relative magnetic permeability ($\mu_r$) resulting from when the mark is subjected to the incident radiation with a wavelength ($\lambda$) according to the formula $\lambda(\mu_r)$, wherein $\lambda$ and $\mu_r$ have the meanings indicated above, comparing said measured code with at least one specific code assigned to the security mark discarding the authenticity of the security mark when the value of the measured code in response to said incident radiation does not coincide with the expected code;

accepting the authenticity of the security mark when the value of the measured code in response to said incident radiation coincides with the expected code.

20. The authentication method according to claim 19, wherein the method is carried out for each structure of metamaterials from which the security mark is made.

21. Use of a security mark according to that defined in claim 1, wherein the security mark is applied to an object.

* * * * *